United States Patent
Brew et al.

(10) Patent No.: US 10,241,853 B2
(45) Date of Patent: Mar. 26, 2019

(54) ASSOCIATING A SEQUENCE OF FAULT EVENTS WITH A MAINTENANCE ACTIVITY BASED ON A REDUCTION IN SEASONALITY

(71) Applicant: International Business Machines Corporation, Armonk, NY (US)

(72) Inventors: Anthony T. Brew, Cork (IE); Jonathan I. Settle, Dursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 14/966,089

(22) Filed: Dec. 11, 2015

(65) Prior Publication Data
US 2017/0168882 A1    Jun. 15, 2017

(51) Int. Cl.
*G06F 11/07* (2006.01)
*H04L 12/24* (2006.01)

(52) U.S. Cl.
CPC ........ *G06F 11/079* (2013.01); *G06F 11/0709* (2013.01); *G06F 11/0751* (2013.01); *G06F 11/0787* (2013.01); *G06F 11/0793* (2013.01); *H04L 41/064* (2013.01)

(58) Field of Classification Search
CPC ............. G06F 11/0751; G06F 11/0754; G06F 11/0793; G06Q 10/20
See application file for complete search history.

(56) References Cited

U.S. PATENT DOCUMENTS

| 8,370,466 | B2 | 2/2013 | Verma et al. |
| 8,639,988 | B2 * | 1/2014 | Wang .................. H04L 41/0631 714/26 |
| 8,700,761 | B2 | 4/2014 | Bajpay et al. |

(Continued)

FOREIGN PATENT DOCUMENTS

WO    2013155807 A1    10/2013

OTHER PUBLICATIONS

"ManageEngine OpManager—A fault management whitepaper" Whitepaper, MaageEngine powering IT ahead, Sep. 17, 2015, p. 1-8.

(Continued)

*Primary Examiner* — Joseph O Schell
(74) *Attorney, Agent, or Firm* — Cantor Colburn LLP; Richard Wilhelm

(57) ABSTRACT

An event management method of attributing a seasonal fault to maintenance activity is described. The method includes identifying a sequence of fault events as a seasonal fault, and calculating an initial seasonality metric indicating a degree of seasonality of the sequence of fault events. One or more maintenance windows are identified, and then a subset of the sequence of the fault events which correspond in time with the maintenance windows are identified. A compensated seasonality metric is calculated for the sequence of fault events minus at least some of the subset of fault events. Based on determining that the compensated seasonality metric indicates a reduction in seasonality compared with the initial seasonality metric, an indication that the sequence of fault events is associated with maintenance activities is generated.

18 Claims, 3 Drawing Sheets

(56) References Cited

U.S. PATENT DOCUMENTS

| | | | |
|---|---|---|---|
| 2003/0200055 A1* | 10/2003 | Butler | G05B 23/0235 |
| | | | 702/183 |
| 2007/0112576 A1* | 5/2007 | Avery | G06Q 10/06393 |
| | | | 705/7.39 |
| 2008/0147264 A1* | 6/2008 | Doulatshahi | G06Q 10/06 |
| | | | 701/29.5 |
| 2008/0162081 A1* | 7/2008 | Sato | G06F 11/008 |
| | | | 702/184 |
| 2010/0121520 A1* | 5/2010 | Yukawa | G06F 11/0793 |
| | | | 701/31.4 |
| 2011/0137697 A1* | 6/2011 | Yedatore | G05B 23/0283 |
| | | | 705/7.13 |
| 2012/0016886 A1* | 1/2012 | Cohen | G06F 17/18 |
| | | | 707/748 |
| 2013/0173480 A1* | 7/2013 | Paul | G06Q 10/20 |
| | | | 705/305 |
| 2013/0339515 A1 | 12/2013 | Radhakrishnan | |

OTHER PUBLICATIONS

A. Mahimkar, et al., "Rapid Detection of Maintenance Induced Changes in Service Performance" ACM CoNEXT, Dec. 6-9, 2011, p. 1-12.

* cited by examiner

ASSOCIATING A SEQUENCE OF FAULT EVENTS WITH A MAINTENANCE ACTIVITY BASED ON A REDUCTION IN SEASONALITY

BACKGROUND

The present invention relates to event management in a data processing system, and in particular to an apparatus and method for attributing a seasonal fault to maintenance activity.

Data center and network management disciplines to date have focused extensively on fault and root cause analysis processes, tools and best practices. When events occur in a data center, an SNMP (Simple Network Management Protocol) or other notification is sent to an event manager (for example IBM's Netcool OMNIbus or Netcool Operations Insight). The event may be de-duplicated, correlated and enriched. It may be handled via a policy enforced by a rules engine. It may be used to automatically create a ticket for a help desk. Events and tickets are the backbone of fault management. Anything that reduces the number of events, and the number of tickets without affecting the performance and availability of services in the data center is very easily mapped to reduced cost, reduced mean time to repair (MTTR), and increased return on investment (ROI).

SUMMARY

According to an embodiment a method for managing events in a data processing system is provided. The method includes identifying a sequence of fault events as a seasonal fault, and calculating an initial seasonality metric indicating a degree of seasonality of the sequence of fault events, identifying one or more maintenance windows and identifying a subset of the sequence of the fault events which correspond in time with the maintenance windows. The method also includes calculating a compensated seasonality metric for the sequence of fault events minus at least some of the subset of fault events and based on determining that the compensated seasonality metric indicates a reduction in seasonality compared with the initial seasonality metric, generating an indication that the sequence of fault events is associated with maintenance activities.

Other aspects of the present invention include an event management apparatus for attributing a fault to maintenance activity and a computer program for the same.

DETAILED DESCRIPTION

The present technique observes maintenance periods or change records to identify resources that may have been affected by these activities, so that in future correct flagging of maintenance can be achieved. This may reduce the events and tickets that operators are required to deal with on a daily basis. More particularly, the present technique recognises that sometimes the resources (devices and functions) which will be impacted by maintenance activities will be incorrectly scoped. In other words, there may be devices on a network which are impacted by maintenance activities but which are not identified as such in advance. This can be because an administrator performing maintenance is not aware of the impact of their actions on other parts of the system.

The present technique seeks to address this, by aligning suggested maintenance activity with seasonal events (where applicable) and optionally creating a ranked worklist highlighting those entries that are most likely to be collisions. It might be deemed that these problem events occur "seasonally". However, in event management systems the problem may not re-surface for every period, and by "seasonal" in an event management system it is meant that a fault has a higher probability of re-occurring for certain periods of time than others. For example a weekly problem may not re-occur every week, but it has a higher chance of occurring on a given day than others.

Maintenance activity tends to be scheduled and can therefore be readily recognized by seasonality analysis. The present technique automatically links improperly scoped known maintenance windows (ones that do not fully list the resources that have been impacted) with events that have been identified as seasonal in nature. The linkage can be presented to an operator to enable such events to be disregarded so that the operator can concentrate on other (non-maintenance-related) events.

Figure 1:
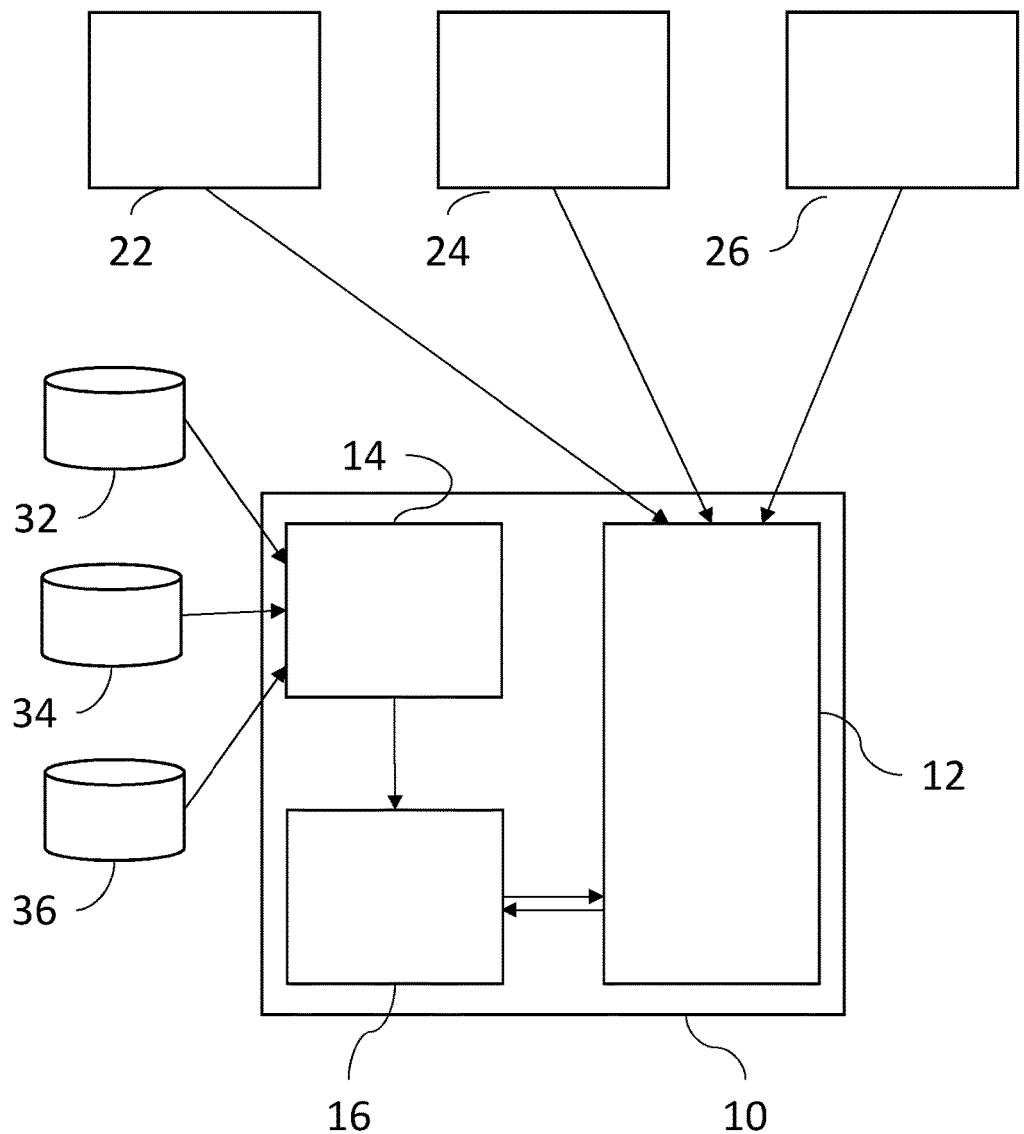
FIG. 1 schematically illustrates an event manager according to an embodiment of the invention.

Referring to FIG. 1, an event manager 10 is shown to comprise a seasonality processor 12, a maintenance window detector 14 and a correlator 16. The maintenance window detector 14 is able to identify maintenance windows (time periods which correspond with downtime of devices or software applications due to repairs, fault resolution, upgrades and the like) based on information stored in an event log 32 which stores previous fault events, a change record database 34 and a maintenance window database 36 which stores historical data on maintenance windows. In particular, information on a start and end time of maintenance activities can be derived by the maintenance window detector 14 from the databases 32, 34, 36. This information is then passed to the correlator 16. The seasonality processor 12 is operable to receive fault event messages (for example SNMP messages) from network entities 22, 24, 26 which may be data centers, or other network devices, indicating that there is an apparent hardware and/or software fault in relation to those entities, or to another device or program associated therewith. The seasonality processor 12 is operable to pass (at least some of) these fault events to the correlator 16. The correlator 16 is operable to correlate the fault events received from the seasonality processor 12 with the maintenance windows received from the maintenance window detector 14 to find ones of those fault events which correspond in time with one or more of the maintenance windows. This information is then passed back to the seasonality processor 12 which further processes this information to determine the extent to which a particular fault sequence appears to relate to maintenance activities.

Figure 2:
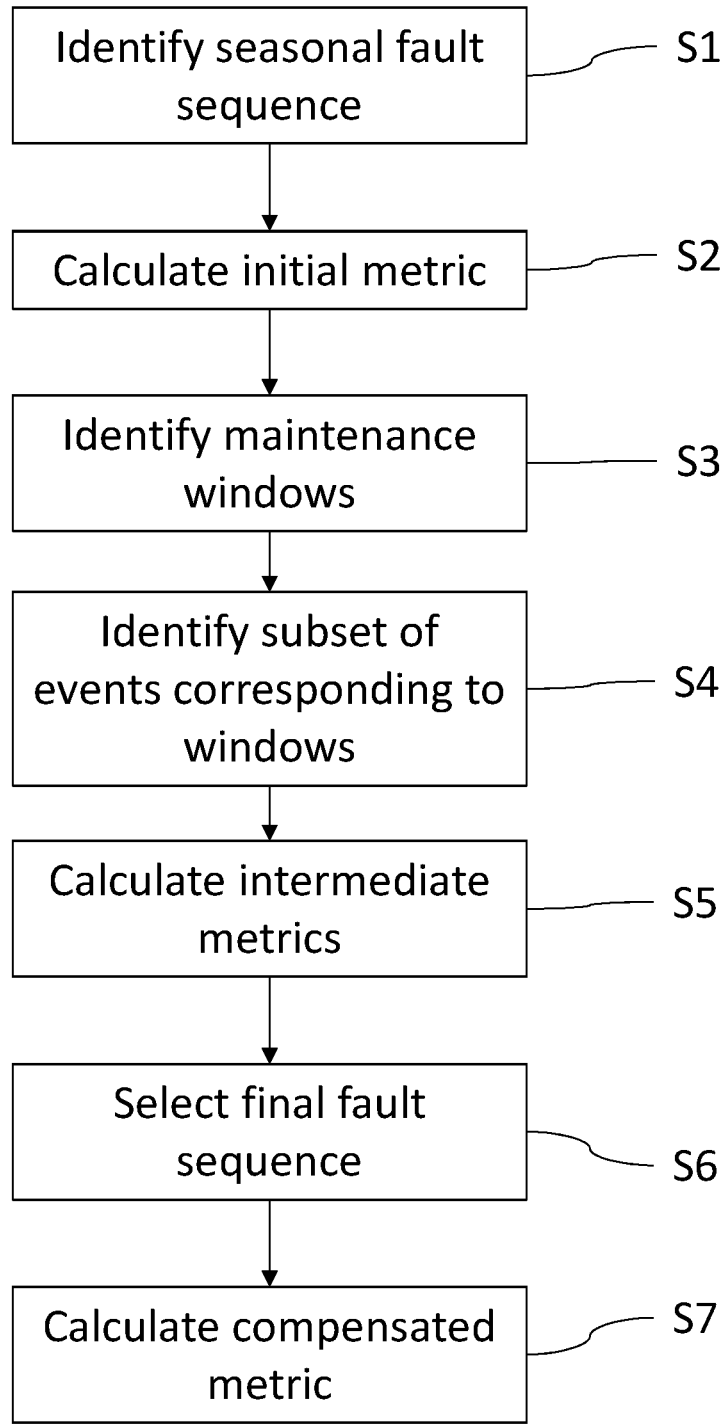
FIG. 2 is a schematic flow diagram illustrating a method of attributing a seasonal fault to maintenance activity according to an embodiment of the invention.
Figure 3:
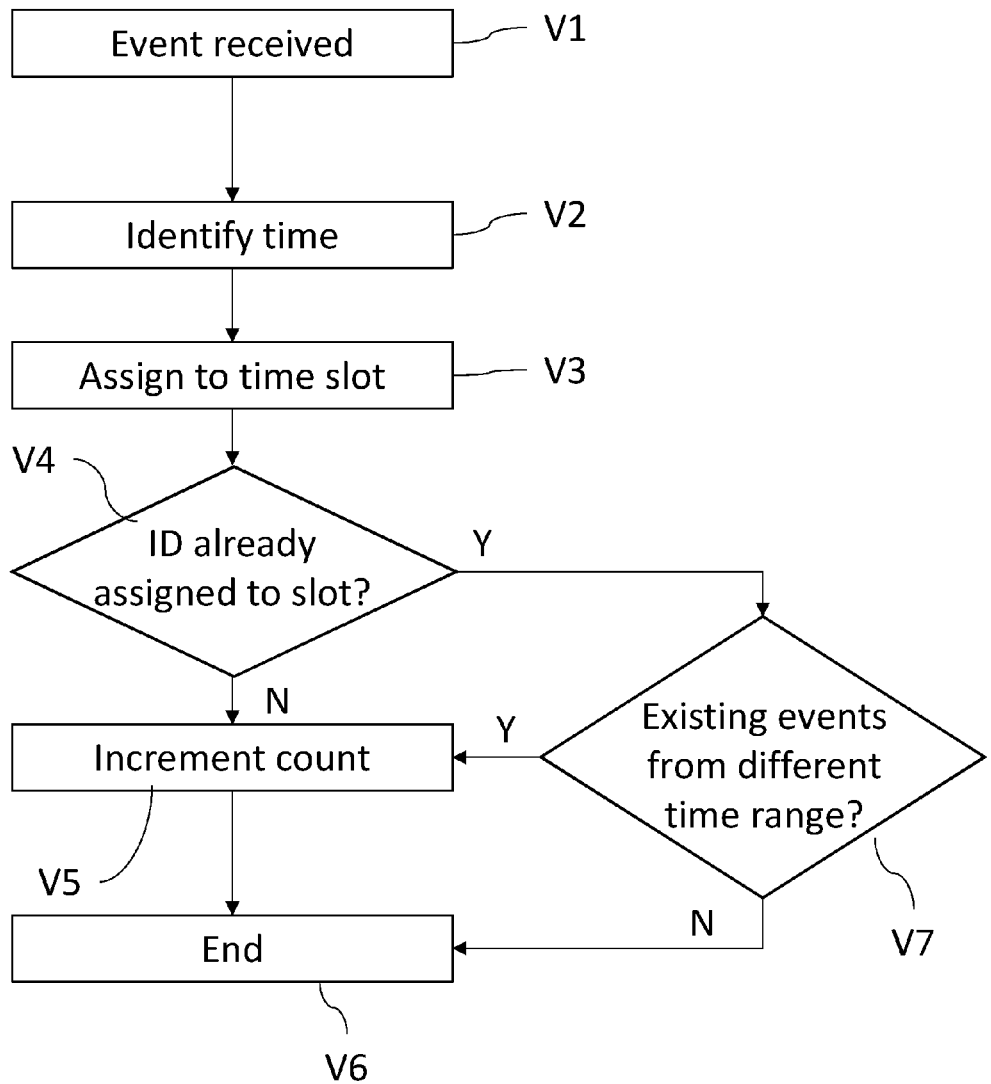
FIG. 3 is a schematic flow diagram of a method of identifying a sequence of fault events as a seasonal fault.

Referring to FIG. 2, as shown at block S1, the seasonality processor 12 identifies a sequence of fault events as a seasonal fault. The algorithm used to detect a seasonal fault takes a stream of discrete sparse de-duplicated events, each received as a fault event message from a network device such as a data center, associates each fault event with an identifier (ID) and bins the fault events according to the "seasonal" patterns to be observed. FIG. 3 indicates one technique for generating a data structure from a sequence of fault events which can then be subject to seasonality analysis.

In particular, referring now to FIG. 3, as shown at block V1 a fault event message is received at the event manager 10, and is assigned an ID by extracting from the fault event message fault event identifiers of faulty hardware or software entities. Multiple fault events are then associated together in relation to the same entity based on ID. Fault events are associated with the same identifier if they are associated with the same hardware and/or software entity and/or a particular fault in relation to that hardware and/or software entity. In order to implement the present technique, a data structure is provided which has an array of elements each corresponding to a time slot within a repeating time range.

As shown at block V2, a time associated with the fault event (and particularly to each of the associated fault events) is identified by the seasonality processor 12 (for example from a time stamp in the fault event message), and as shown at block V3 the fault event is assigned by the seasonality processor 12 to one of the time slots, or bins, in dependence on its time. It will therefore be understood that predefined bin-types (minute of hour/hour of day/day of the week/day of the month) are used. Each event identifier has its own set of bins of the previous counts for this ID. The seasonal patterns may be day of the week, hour of day and so on.

As shown at block V4, it is determined by the seasonality processor 12 whether the particular fault or entity (as indicated by the ID) has already been assigned to that time slot (that is, a previous fault event having the same ID has been received). If not, then as shown at block V5 a count value is incremented by the seasonality processor 12 for that time slot, and the process (in relation to that particular fault) terminates as shown at block V6. If however at the block V4 it is determined that the particular fault or entity has previously been assigned to that slot then at as shown at block V7 it is determined whether the fault events previously received in relation to that time slot and ID occurred within a different time range, or the same time range. If the previous fault events occurred within the same time range (for example on the same day in the case of each time slot being an hour of the day), then the count value for that time slot is not incremented and the process simply terminates at the block V6. However, if the previous fault events occurred within a different time range (for example on a previous day), then the count value is incremented at the block V5. In this way, a count value for a particular time slot is incremented each time a fault event from a different time range is assigned to the particular time slot.

It will be appreciated that the blocks V4 and V5 permit a second level of de-duplication to be performed at the granularity of the bin type being observed (for example minute, hour, day) to build up a de-duplicated count distribution for analysis. Specifically, the bin count is incremented by one, provided that this bin-count has not already been incremented within the same granularity as specified by the bin-type (for example same minute, for minute of hour bin-type, same hour, for hour of day bin-type, same day, for day of month bin type). This block is conducted because an event can occur many times within the same time period and if it is counted multiple times the statistical test conducted next will provide meaningless results. To take an example, with hour of day binning, if the first event is received at 17:34 on 11th Nov. 2013, the hour of the day bin value 17 would be incremented from 0 to 1. If the next event was received at 17:55 on 11th Nov. 2013 (the same day), the hour of the day bin 17 would not be incremented and would still be 1. If the next event was received at 17:34 on 13th Nov. 2013 the hour of the day bin 17 value would be incremented to 2 because the day has changed (and so it is in a different one of a repeating time range of a day). In other words, the count for the hour 17 can only be incremented once on any given day, and more generally the count for a time slot within a time range can only be incremented once within any given instance of that time range. It will be appreciated that the repeating time range could for example be one of an hour, a day, a week or a month. Similarly, it will be appreciated that the time slot could for example be one of a minute, an hour, a day or a week. The steps of FIG. 3 effectively prepare a data structure (an array of count values corresponding to time slots within a time range) for seasonality analysis.

Referring back to FIG. 2, at as shown at block S2 the seasonality processor 12 calculates an initial seasonality metric p indicating a degree of seasonality of the sequence of fault events by testing the sequence of fault events (bin count distribution) against a uniform distribution (that is, one in which each bin has an equal count) using a proportionality test. The initial metric produces a score indicating how likely the observed bin counts are to be seasonal/non-uniform. The value p is obtained in relation to the seasonality of the event, for all events within a sequence E. One example of a suitable proportionality test is a Pearsons Chi Squared test. There are variants and corrections which can be applied to the basic Chi-Squared test if necessary to accommodate low counts such as Chi-Squared tables built via Monte-Carlo techniques. In particular, for each ID and for each of its bin-types based on their currently aggregated count, the bin count array is passed to the proportionality test to test against the expected uniform distribution of events across all bins. This test provides a score (p-value) indicative of the likelihood that the bin counts for the associated event ID were not drawn from the flat uniform distribution, with a higher score indicating that the observed distribution has a "seasonal" pattern (non-uniform distribution). It will be appreciated that this is just one of many possible statistical tests which can be used to determine whether the distribution of count values in the array contains a repeating (seasonal) pattern, and other techniques are well known.

To summarise the block S2, taking a function $p=S(E)$ of a sequence of events E which are of interest, in which the function S is the algorithm (for example Chi-squared) for determining the likelihood of the sequence of events E being seasonal in nature, then an initial metric p is calculated which may take a value between 0 and 1, where a value of 1 represents the sequence E being highly seasonal and 0 represents the sequence E being uniform in nature. If the value of p is below a predefined threshold (for example, but not limited to, 0.99), then the event is simply defined as being non-seasonal, and is not further processed.

It will be appreciated that the present technique can either work in a streaming fashion as new events are received at the event manager, or from data pulled from an historical data source.

As shown at block S3, one or more maintenance windows are identified by the maintenance window detector 14. Maintenance windows can be obtained from different places, and may for example be found by several means, such as:

Scanning historic archives (for example the event log 32) of other events that have previously been flagged as relating to maintenance when they occurred (either flagged previously based on the present technique, or flagged previously using other techniques)

Identifying historic maintenance windows in specific software (for example from the maintenance window database 36)

Examining change record databases, such as the database 34

If the value of p is at or above the predefined threshold, then the time of occurrence of events in the sequence is compared to one or more known maintenance windows at as shown at block S4 by the correlator 16, to find events in the sequence E that are close in adjacency to maintenance activity. In this way a subset of the sequence of the fault events which correspond in time (for example are close in time, or overlap with) with the maintenance windows can be identified. The subset of events from E which correspond to a maintenance window are denoted by M—these events are candidates for being due to maintenance.

As shown at block S5, for each fault event within the subset M, an intermediate seasonality metric is calculated by the seasonality processor 12 for the sequence of fault events E minus that fault event, and if the intermediate seasonality metric indicates a reduction in seasonality compared with the initial seasonality metric then that fault event is assigned to a candidate set C to be removed from the sequence of fault events E in the calculation of a compensated seasonality metric.

In particular, for each discrete event $e\_i$ in M if $S(E-e\_i) < S(E)$ add $e\_i$ to the candidate set C As shown at block S6, a final fault event sequence is obtained by the seasonality processor 12 by removing all of the candidate set C from the original set E. Then, as shown at block S7, a compensated seasonality metric $S(E-C)$ is calculated by the seasonality processor 12 for the sequence of fault events E minus at least some of the subset of fault events (that is, C). Then, the reduction in seasonality $S(E) - S(E-C)$ resulting from omitting the subset C from the fault sequence is calculated.

If the compensated seasonality metric indicates a reduction in seasonality compared with the initial seasonality metric, an indication that the sequence of fault events is associated with maintenance activities can be generated. The reduction is seasonality $S(E)-S(E-C)$ can be considered an indicator of the likelihood of the fault represented by the sequence $S(E)$ being seasonal in nature, and multiple sequences of events can be priority ordered as a function of this likelihood. Further, an operator can be provided with the event sequence and the suspected conflicting maintenance window events (that is, maintenance activities associated with the sequence of fault events). Various other related information can be provided to the operator. For example, an indication that the sequence of fault events is associated with maintenance activities may include an indication of the magnitude of the decrease in seasonality of the compensated seasonality metric compared with the initial seasonality metric. The greater this decrease the greater the interest in it, because when operating at volume, large decreases in seasonality mean that the seasonal event was more likely to have been affected primarily by known maintenance activity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structure in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comb puter copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FGPA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture instructing instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart of block diagrams may represent a module, segment, or portion of instruction, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of managing events in a data processing system, the method comprising:
    identifying a sequence of fault events as a seasonal fault in the data processing system, wherein identifying a sequence of fault events as a seasonal fault comprises extracting from fault events identifiers of faulty hardware or software entities and associating together fault events in relation to a same entity;
    calculating an initial seasonality metric indicating a degree of seasonality of the sequence of fault events;
    identifying one or more maintenance windows;
    identifying a subset of the sequence of the fault events which correspond in time with the maintenance windows;
    calculating a compensated seasonality metric for the sequence of fault events minus at least one of the subset of fault events; and
    based on determining that the compensated seasonality metric indicates a reduction in seasonality compared with the initial seasonality metric, generating an indication that the sequence of fault events is associated with maintenance activity.

2. A method according to claim 1, comprising, for each fault event within the subset, calculating an intermediate seasonality metric for the sequence of fault events minus a fault event, and based on determining that the intermediate seasonality metric indicates a reduction in seasonality compared with the initial seasonality metric then assigning the fault event to be removed from the sequence of fault events in the calculation of the compensated seasonality metric.

3. A method according to claim 1, wherein the indication that the sequence of fault events is associated with maintenance activities comprises an indication of a magnitude of a decrease in seasonality of the compensated seasonality metric compared with the initial seasonality metric.

4. A method according to claim 1, wherein the indication that the sequence of fault events is associated with maintenance activities comprises an indication of the maintenance activities associated with the sequence of fault events.

5. A method according to claim 1, wherein the maintenance windows are identified from previous events which have been flagged as relating to maintenance activities.

6. A method according to claim 1, wherein the maintenance windows are identified from historic maintenance windows.

7. A method according to claim 1, wherein the maintenance windows are obtained from change record databases.

8. A method according to claim 1, comprising providing a data structure having an array of elements each corresponding to a time slot within a repeating time range, wherein identifying a sequence of fault events as a seasonal fault comprises identifying a time associated with each of the associated fault events, assigning the associated fault events to one of the time slots in dependence on its time, and incrementing a count value for a particular time slot each time a fault event from a different time range is assigned to the particular time slot.

9. A method according to claim 8, wherein the repeating time range is one of an hour, a day, a week or a month.

10. A method according to claim 8, wherein the time slot is one of a minute, an hour, a day or a week.

11. A method according to claim 8, wherein identifying a sequence of fault events as a seasonal fault comprises testing the sequence of fault events against a uniform distribution using a proportionality test.

12. A method according to claim 11, wherein the proportionality test is a Pearsons Chi Squared test.

13. A method according to claim 12, wherein the proportionality test uses a Monte Carlo technique to generate the Chi Squared test.

14. An event management apparatus comprising:
    a processor coupled to a memory, the processor configured to:
    identify a sequence of fault events as a seasonal fault, and to calculate an initial seasonality metric indicating a degree of seasonality of the sequence of fault events in the processing system, wherein identifying a sequence of fault events as a seasonal fault comprises extracting from fault events identifiers of faulty hardware or software entities and associating together fault events in relation to a same entity;

identify one or more maintenance windows;

identify a subset of the sequence of the fault events which correspond in time with the maintenance windows;

calculate a compensated seasonality metric for the sequence of fault events minus at least one of the subset of fault events, and based on determining that the compensated seasonality metric indicates a reduction in seasonality compared with the initial seasonality metric, generate an indication that the sequence of fault events is associated with maintenance activity.

15. An apparatus according to claim 14, wherein the processor is further configured to, for each fault event within the subset, calculate an intermediate seasonality metric for the sequence of fault events minus a fault event, and based on determining that the intermediate seasonality metric indicates a reduction in seasonality compared with the initial seasonality metric then to-assign the fault event to be removed from the sequence of fault events in the calculation of the compensated seasonality metric.

16. An apparatus according to claim 14, wherein the indication that the sequence of fault events is associated with maintenance activities comprises an indication of a magnitude of a decrease in seasonality of the compensated seasonality metric compared with the initial seasonality metric.

17. An apparatus according to claim 14, wherein the indication that the sequence of fault events is associated with maintenance activities comprises an indication of the maintenance activities associated with the sequence of fault events.

18. A computer program product for managing events in a data processing system, the computer program product comprising a computer readable storage medium having program instructions embodied therewith, the program instructions executable by the data processing system to cause the data processing system to perform a method comprising:

identifying a sequence of fault events as a seasonal fault in the processing system, wherein identifying a sequence of fault events as a seasonal fault comprises extracting from fault events identifiers of faulty hardware or software entities and associating together fault events in relation to a same entity;

calculating an initial seasonality metric indicating a degree of seasonality of the sequence of fault events;

identifying one or more maintenance windows;

identifying a subset of the sequence of the fault events which correspond in time with the maintenance windows;

calculating a compensated seasonality metric for the sequence of fault events minus at least one of the subset of fault events; and based on determining that the compensated seasonality metric indicates a reduction in seasonality compared with the initial seasonality metric, generating an indication that the sequence of fault events is associated with maintenance activities.

\* \* \* \* \*